(12) United States Patent
Chen

(10) Patent No.: US 10,302,883 B2
(45) Date of Patent: May 28, 2019

(54) OPTICAL COUPLING ASSEMBLIES

(71) Applicant: FINISAR CORPORATION, Sunnyvale, CA (US)

(72) Inventor: Jiashu Chen, Los Altos, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 15/826,119

(22) Filed: Nov. 29, 2017

(65) Prior Publication Data

US 2018/0149820 A1 May 31, 2018

Related U.S. Application Data

(60) Provisional application No. 62/427,281, filed on Nov. 29, 2016.

(51) Int. Cl.
| | |
|---|---|
| *G02B 6/26* | (2006.01) |
| *G02B 6/43* | (2006.01) |
| *G02B 6/42* | (2006.01) |
| *G02B 6/04* | (2006.01) |
| *G02B 6/36* | (2006.01) |

(52) U.S. Cl.
CPC ............. *G02B 6/43* (2013.01); *G02B 6/04* (2013.01); *G02B 6/4232* (2013.01); *G02B 6/4249* (2013.01); *G02B 6/3644* (2013.01); *G02B 6/4214* (2013.01)

(58) Field of Classification Search
CPC ........ G02B 6/26; G02B 6/262; G02B 6/4214; G02B 6/43; H01L 2924/00
See application file for complete search history.

(56) References Cited

U.S. PATENT DOCUMENTS

| | | | |
|---|---|---|---|
| 9,103,997 B2 * | 8/2015 | Lai | G02B 6/428 |
| 9,122,031 B2 * | 9/2015 | Wu | G02B 6/428 |

* cited by examiner

*Primary Examiner* — Jennifer Doan
(74) *Attorney, Agent, or Firm* — Maschoff Brennan

(57) ABSTRACT

An optical coupling assembly includes optical fibers and a fiber coupling structure assembly that includes an active optical component (AOC) array. The AOC array includes wafer material, AOCs, and soldering pads. The fiber coupling structure assembly includes a rigid substrate that defines apertures and includes an array connection surface on which additional soldering pads are formed. The rigid substrate is fixed to the AOC array by bump joints that connect the soldering pads of the AOC array with the additional soldering pads formed on the array connection surface such that each of the apertures is aligned with a corresponding one of the AOCs. The optical fibers may be positioned relative to the one or more apertures such that an optical signal may be communicated between a corresponding one of the optical fibers and a corresponding one of the AOCs via a corresponding one of the one or more apertures.

20 Claims, 7 Drawing Sheets

OPTICAL COUPLING ASSEMBLIES

CROSS-REFERENCE TO RELATED APPLICATION

This application claims the benefit of and priority to U.S. Provisional Application No. 62/427,281 filed Nov. 29, 2016, which is incorporated herein by reference in its entirety.

FIELD

Embodiments disclosed herein relate to optical systems and in particular to optical coupling assemblies implemented in the optical systems.

BACKGROUND

Optical systems and computer processing systems with onboard optics may include active optical components (AOCs) that generate optical signals and/or receive optical signals. The optical signals may travel through optical fibers that communicatively connect the AOCs to other computing systems.

An issue in the construction of the optical systems and computer processing systems includes alignment of the optical fibers with the AOCs. In some optical systems, the optical fibers are aligned using a V-groove structure and/or a lens. The V-groove structure may include two angled surfaces onto which one of the optical fibers is positioned.

The lens may be configured to focus and/or collimate optical signals prior to entry into the optical fibers or following exit from the optical fibers. For instance, in optical modules in which the AOCs include an optical transmitter, the optical signal generated by the optical transmitter may pass through the lens to focus the optical signal onto an optical fiber. In addition, in optical modules in which the active optical component includes an optical receiver, an optical signal exiting an optical fiber may pass through a lens such that the optical signal impinges on the optically sensitive portion of the optical receiver.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

An aspect of an embodiment of the invention may include an optical coupling assembly. The optical coupling assembly may include a fiber coupling structure assembly and one or more optical fibers. The fiber coupling structure assembly may include an active optical component (AOC) array that includes wafer material, one or more AOCs, and one or more soldering pads. The fiber coupling structure assembly may include a rigid substrate that may define one or more apertures and may include an array connection surface on which one or more additional soldering pads are formed. The rigid substrate may be fixed to the AOC array by bump joints that connect the one or more soldering pads of the AOC array with the one or more additional soldering pads formed on the array connection surface such that each of the one or more apertures is aligned with a corresponding one of the one or more AOCs. The optical fibers may be positioned relative to the one or more apertures such that an optical signal may be communicated between a corresponding one of the optical fibers and a corresponding one of the one or more AOCs via a corresponding one of the one or more apertures.

Another aspect may include fiber coupling structure assembly. The fiber coupling structure assembly may include a wafer material, an active optical component (AOC), two soldering pads, a rigid substrate, and two bump joints. The AOC may be formed in the wafer material. The two soldering pads may be formed on a surface of the wafer material. The two soldering pads may be positioned adjacent to the AOC. The rigid substrate may define an aperture and may include an array connection surface on which two additional soldering pads may be formed adjacent to the aperture. The two bump joints may connect the two soldering pads formed on the surface of the wafer material to the two additional soldering pads formed on the array connection surface. The soldering pads on the surface of the wafer material and the additional soldering pads may be formed on the array connection surface such that a centerline of the aperture is aligned with an active portion of the AOC. The AOC may be separated from the array connection surface by a gap interval that enables communication of an optical signal between the aperture and the AOC without a lens positioned therebetween.

Yet another aspect may include an optical coupling assembly. The optical coupling assembly may comprise an active optical component (AOC) array, a rigid substrate, and one or more optical fibers. The AOC array may include wafer material, one or more AOCs, and one or more soldering pads. The rigid substrate may define one or more apertures and may include an array connection surface on which one or more additional soldering pads are formed. The rigid substrate may be fixed to the AOC array by bump joints that connect the one or more soldering pads of the AOC array with the one or more additional soldering pads formed on the array connection surface such that each of the one or more apertures is aligned with a corresponding one of the one or more AOCs. The optical fibers may be positioned relative to the apertures such that an optical signal may be communicated between a corresponding one of the optical fibers and a corresponding one of the one or more AOCs via a corresponding one of the one or more apertures.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DETAILED DESCRIPTION OF SOME EXAMPLE EMBODIMENTS

Some embodiments described herein include optical coupling assemblies that may provide a fiber-to-source direct coupling or fiber to optical waveguide-source coupling. The coupling assemblies include fiber coupling structures. The fiber coupling structures may include a rigid substrate that is attached to an active optical component (AOC) array. The rigid substrate may be configured to retain portions of optical fibers such that the optical fibers are aligned with AOCs included in the AOC array.

Moreover, in some embodiments, the rigid substrate may retain an end of the optical fiber at a distance relative to AOCs such that lenses are not used to focus and/or collimate an optical signal generated or received by the AOCs. Accordingly, some optical coupling assemblies that include the rigid substrate may enable direct communication of optical signals without lenses positioned between the AOCs and the optical fibers.

The rigid substrate may include one or more apertures. In some embodiments, the apertures are filled with optical waveguides. In these and other embodiments, optical signals may be communicated via the optical waveguides to the optical fibers or to the AOCs. The rigid substrates may position the waveguides relative to the AOCs to enable direct optical communication between the AOCs and the waveguides without propagation through a lens.

In addition, some optical coupling assemblies may include a straight-through fiber connector or a reflective fiber connector. The straight-through fiber connector or the reflective fiber connector may retain one or more optical fibers. The straight-through fiber connector or the reflective fiber connector may align the optical fiber with the optical waveguides and the AOCs included in the AOC array. The straight-through fiber connector or the reflective fiber connector may support the optical fibers and provide rigidity to the optical fiber coupling assemblies.

Reference will now be made to the drawings to describe various aspects of some embodiments. The drawings are diagrammatic and schematic representations of the embodiments, and are not meant to be limiting, nor are they necessarily drawn to scale. Throughout the appended drawings, like numbers generally reference like structures unless described otherwise.

Figure 1:
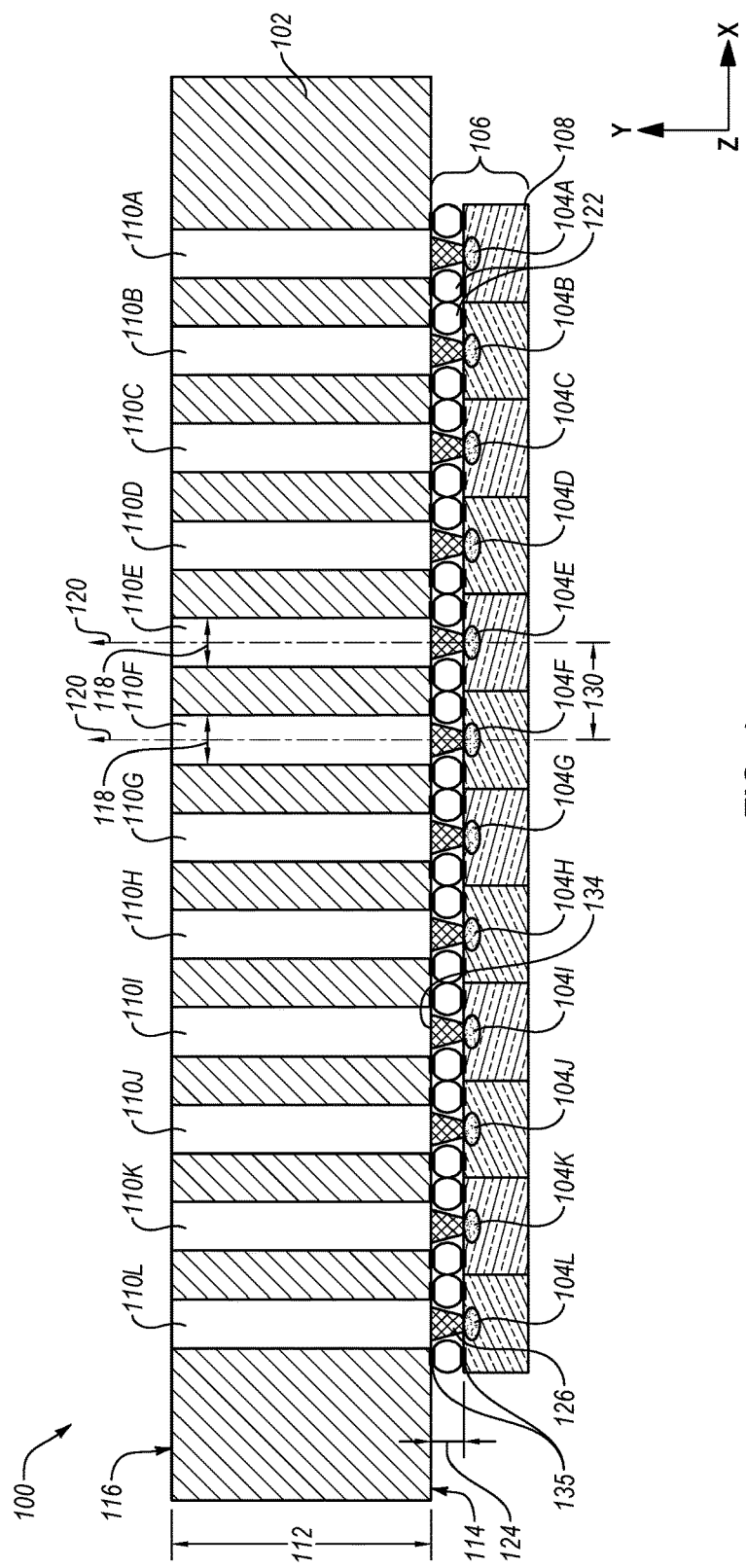
FIG. 1 illustrates an example fiber coupling structure assembly (fiber coupling assembly)

FIG. 1 illustrates a block diagram of an example fiber coupling structure assembly (fiber coupling assembly) 100. The view of FIG. 1 depicts a sectional view of the fiber coupling assembly 100. The fiber coupling assembly 100 may include a rigid substrate 102 that may be positioned relative to an AOC array 106. The fiber coupling assembly 100 may be configured to facilitate optical coupling between optical fibers and the AOC array 106. For example, the fiber coupling assembly 100 may be configured to position and retain the optical fibers in the rigid substrate 102, which is aligned relative to the AOC array 106. In some embodiments, use of the fiber coupling assembly 100 may eliminate inclusion of a lens between the AOC array 106 and the rigid substrate 102.

The AOC array 106 may include one or more AOCs 104A-104L (generally, AOC 104 or AOCs 104) and circuit wafer material 108. The AOCs 104 may include optical transmitters or optical receivers. For example, the AOCs 104 may include lasers such as vertical cavity surface emitting lasers (VCSELs), Fabry-Perot (F-P) lasers, distributed feedback (DFB) laser, distributed Bragg reflector (DBR) lasers, light emitting diodes (LEDs), or other suitable optical emitters. Alternatively or additionally, the AOCs 104 may include PIN photodiodes, avalanche photodiodes (APDs), or another type of optical receiver.

In the AOC array 106 of FIG. 1, the AOCs 104 may be constructed using a wafer construction process during which the AOCs 104 are concurrently or substantially concurrently formed from the circuit wafer material 108. Accordingly, the circuit wafer material 108 may include semiconductor materials used in integrated circuit construction. Furthermore, in the embodiment of FIG. 1, the AOC array 106 includes the AOCs 104. The AOCs 104 may be physically connected to one another, but may be separated by a component interval 130. The component interval 130 may include a center-to-center spacing between the AOCs 104. The component interval 130 is also sometimes referred to as a pitch.

In some embodiments, the AOCs 104 may not be connected. Instead, in these and other embodiments, the AOCs 104 may be constructed, cut apart, and then fixed relative to one another. For instance, the AOCs 104 may be mounted to a common substrate or may be fixed to the rigid substrate 102.

The rigid substrate 102 may be fixed relative to the AOC array 106. The rigid substrate 102 may be configured to retain and fix optical fibers relative to the AOC array 106, which may facilitate optical coupling between the AOC array 106 and the optical fibers. For instance, the rigid substrate 102 may define one or more apertures 110A-110L (generally, aperture 110 or apertures 110).

A number of the apertures 110 may correspond to a number of the AOCs 104. For example, the number of the apertures 110 may correspond one-to-one with the number of the AOCs 104. In particular, the depicted embodiment includes twelve of the AOCs 104 and twelve of the apertures 110.

The apertures 110 may be aligned with one of the AOCs 104. For instance, a first aperture 110A may correspond to and be aligned with a first AOC 104A. Similarly, a second aperture 110B may correspond to and be aligned with a second AOC 104B, a third aperture 110C may correspond to and be aligned with a third AOC 104C, etc.

Alignment of the apertures 110 relative to the AOCs 104 may include centering the apertures 110 over the AOCs 104 or active portions thereof. For instance, the apertures 110 may include an aperture width 118 defined in an arbitrarily defined x-direction. The rigid substrate 102 may be configured such that a centerline 120 in the x-direction of the aperture width 118 is substantially aligned with an active portion of a corresponding one of the AOCs 104. In FIG. 1, the aperture widths 118 and the centerlines 120 are labeled on a fifth aperture 110E and a sixth aperture 110F. The other apertures 110 may include an aperture width 118 and a centerline 120, which may be aligned with a corresponding one of the AOCs 104 or an active portion thereof.

The centerlines 120 of the apertures 110 and the AOCs 104 may be spaced at the component interval 130. The component interval 130 may be defined between active portions of adjacent AOCs 104 in the x-direction. The component interval 130 may be determined during a wafer fabrication process in which the AOCs 104 are constructed.

For example, the AOCs 104 and/or the rigid substrate 102 may be constructed with reference to an optical datum. The optical datum may provide reference points on a substrate on which or from which the AOCs 104 are constructed. An example of the component interval 130 may be between about 248 microns and about 252 microns.

In the depicted embodiment, the rigid substrate 102 includes twelve apertures 110. In other embodiments, the rigid substrate 102 may include more than twelve of the apertures 110 or less than twelve of the apertures 110.

The rigid substrate 102 may include a substrate height 112. The substrate height 112 may extend from an array connection surface 114 to a top substrate surface 116. The apertures 110 may extend from the array connection surface 114 to the top substrate surface 116.

As mentioned above, the rigid substrate 102 may be fixed relative to the AOC array 106. Bump joints 122 may be implemented to connect the circuit wafer material 108 to the array connection surface 114 of the rigid substrate 102. Only two of the bump joints 122 are labeled in FIG. 1 for simplicity.

In some embodiments, the bump joints 122 may be affixed to soldering pads 135. The soldering pads 135 may be formed adjacent to the AOCs 104 on the circuit wafer material 108. The soldering pads 135 may be defined relative to the optical datum with reference to which the AOCs 104 and/or the apertures 110 are defined.

In addition, the soldering pads 135 may be formed on portions of the array connection surface 114. Positions of the soldering pads 135 may be relative to the optical datum. The soldering pads 135 may be formed adjacent to aperture entries 134. Accordingly, the soldering pads 135 may be configured to locate and align the AOCs 104 relative to the apertures 110.

The bump joints 122 may at least partially determine a gap interval 124 that is defined between the AOCs 104 and the rigid structure 102. In general, the gap interval 124 describes a distance an optical signal 126 travels between one of the apertures 110 and one of the AOCs 104. In some embodiments, the gap interval 124 may be determined such that the fiber coupling assembly 100 does not include a lens as described below. For instance, the gap interval 124 may be between about 20 microns and about 50 microns.

In FIG. 1, the optical signal 126 is depicted emitted from a twelfth AOC 104L. As the optical signal 126 travels in the positive y-direction, a width of the optical signal 126 in the x-direction increases. This represents dispersion of the optical signal 126. If the gap interval 124 is sufficiently large, then the width of the optical signal 126 extends outside the aperture 110, which may result in gap losses. Accordingly, the gap interval 124 may be determined such that the optical signal 126 or a substantial portion thereof (e.g., greater than about 80% or about 90%) enters the aperture 110 without being focused.

In embodiments in which one or more of the AOCs 104 includes an optical receiver, the optical signal 126 travels in the negative y-direction. As the optical signal 126 travels in the negative y-direction, the width increases. Accordingly, the gap interval 124 may be configured such that the optical signal 126 or a substantial portion thereof exiting the aperture 110 impinges on the AOC 104 or an active portion thereof.

In alternative embodiments, one or more of the apertures 110 may include a lens. For example, ball lenses may be positioned in the apertures 110 and/or in the gap interval 124 between the apertures 110 and the AOCs 104.

The rigid substrate 102 may be comprised at least partially of glass, silicon materials, or another suitable material. In some embodiments, the rigid substrate 102 may include a portion of a wafer, for instance, for batch processing. In embodiments in which the rigid substrate 102 includes glass, the rigid substrate 102 may be substantially transparent. In embodiments in which the rigid substrate 102 includes silicon material, the rigid substrate 102 may be easier to process when compared to embodiments in which the rigid substrate 102 is comprised of glass.

In some embodiments, the AOC array 106 may be constructed and the rigid substrate 102 may be fixed to the AOC array 106 using the bump joints 122. The apertures 110 may then be defined using a laser drilling process, a blasting process, an etching process with lithographic tools, another construction process, or some combination thereof.

One or more optical fibers may be positioned relative to the apertures 110. For example, the optical fibers may be positioned relative to the apertures 110 such that an optical signal (e.g., 126) traveling on the optical fibers may be communicated with one of the AOCs 104. FIGS. 2A-4B include embodiments in which the fiber coupling assembly 100 or a variation thereof is included with one or more optical fibers 201. In FIGS. 2A-4, the optical fibers 201 may include single mode fiber (SMF) or multi-mode fiber (MMF).

Figure 2A:
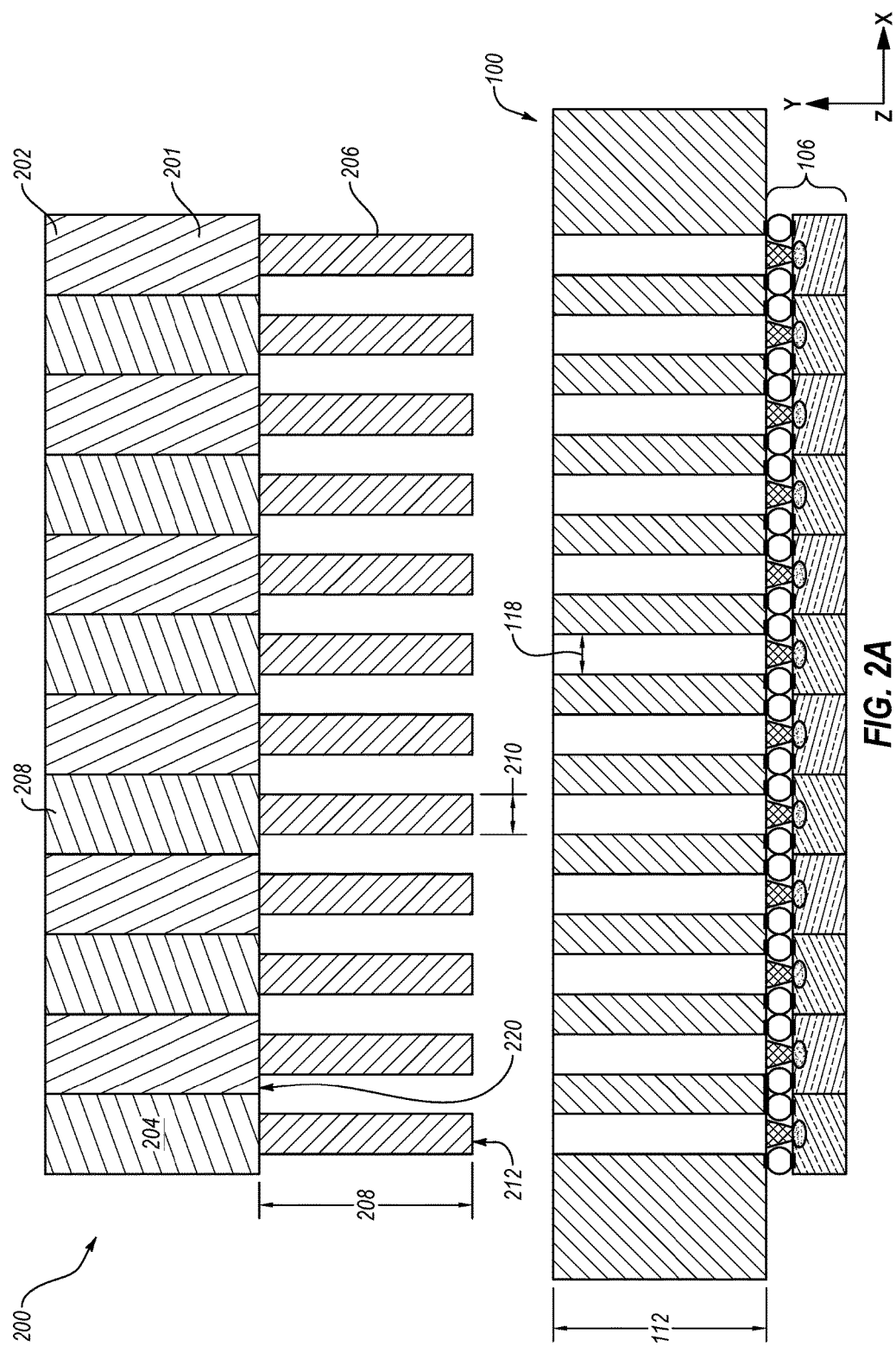
FIGS. 2A and 2B illustrate a block diagram of an example optical coupling assembly that implements an embodiment of the fiber coupling assembly of FIG. 1.
Figure 2B:
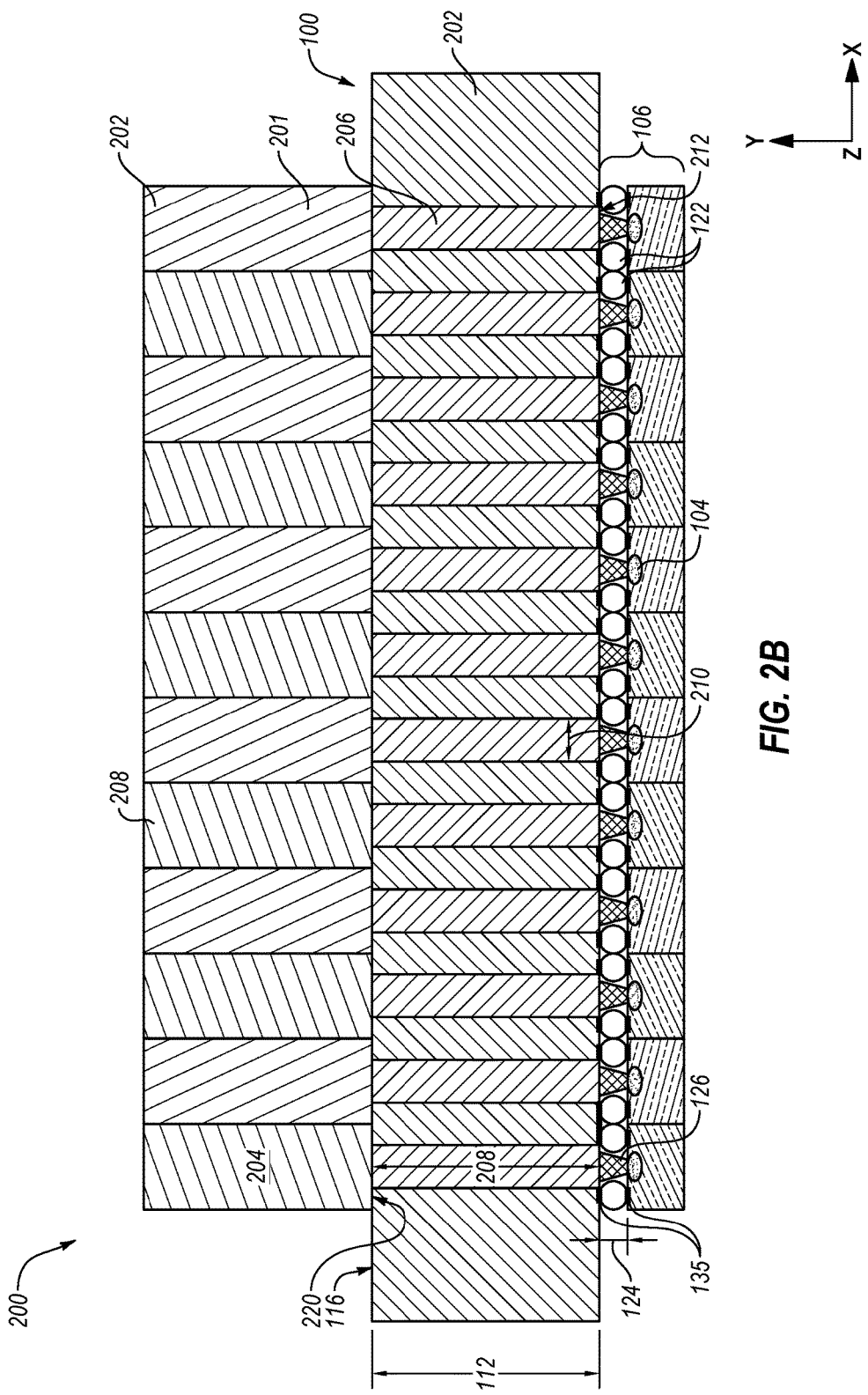

FIGS. 2A and 2B illustrate a block diagram of a first example optical coupling assembly (first optical coupling assembly) 200. In the first optical coupling assembly 200, an embodiment of the fiber coupling assembly 100 of FIG. 1 is included with a fiber array 202 that includes multiple optical fibers 201. FIG. 2A depicts the fiber array 202 separated from the fiber coupling assembly 100. FIG. 2B depicts the fiber array 202 engaged with the fiber coupling assembly 100.

With reference to FIG. 2A, the fiber array 202 includes the optical fibers 201, each embedded at least partially in a jacket 204. The jacket 204 may be removed from terminal portions 206 of the optical fibers 201. The jacket 204 may remain over an unengaged portion of the fiber array 202.

A fiber diameter 210 of the terminal portions 206 may be substantially similar to the aperture width 118. In some embodiments, for instance, the aperture width 118 may be between about 50 microns and about 75 microns. Similarly, the fiber diameter 210 may be approximately equal to the aperture width 118. The fiber diameter 210 may be a few microns (e.g., less than 10 microns) smaller than the aperture width 118 to enable positioning of the terminal portions 206 in the apertures 110.

Alternatively or additionally, a shape of the terminal portions 206 (e.g., cylindrical solid) may be complementary to a shape of the apertures 110 (e.g., cylindrical cavities) such that the terminal portions 206 may be securely received within the apertures 110. In addition, the terminal portions 206 may include a terminal length 208. The terminal length 208 may extend from an edge 220 of the jacket 204 to fiber ends 212. The terminal length 208 may be substantially similar to the substrate height 112. In FIG. 2A, only one of the terminal lengths 208, the fiber diameters 210, and the aperture widths 118 are labeled for simplicity.

With reference to FIG. 2B, the fiber array 202 is depicted engaged in the rigid substrate 102. In some embodiments, an epoxy or an adhesive may be applied to the terminal portions 206 and the terminal portions 206 may be positioned in the apertures 110. The epoxy may harden to secure the terminal portions 206 relative to the rigid substrate 102.

To optically couple the optical fibers 201 to the AOCs 104, the fiber array 202 may be moved in the negative y-direction relative to the rigid substrate 102. When engaged in the rigid substrate 102, each of the terminal portions 206 of the optical fibers 201 is positioned in a corresponding one of the apertures 110. In addition, in some embodiments, an edge 220 of the jacket 204 may contact at least a portion of the top substrate surface 116.

When positioned in the apertures 110, the fiber ends 212 may be coplanar or substantially coplanar with the array connection surface 114 of the rigid substrate 102. In the embodiment of FIG. 2B, the gap interval 124 may be defined between the AOCs 104 and the fiber ends 212. Accordingly, the optical signal 126 may be communicated directly to the optical fiber 201 from the AOCs 104 or directly from the optical fiber 201 to the AOCs 104. For instance, direct communication of the optical signal 126 between the optical fiber 201 and the AOCs 104 may include communication that does not propagate through a lens positioned between the optical fiber 201 from the AOCs 104.

In some embodiments, the first optical coupling assembly 200 may include a lens. The lens may be positioned in one or more of the apertures 110. Additionally or alternatively, one or more lenses may be positioned between the fiber ends 212 and the AOCs 104. In these embodiments, the rigid substrate 102 may enable optical coupling between the optical fibers 201 and the AOCs 104.

Proper alignment between the AOCs 104 and the optical fibers 201 may be based on the precision in which the apertures 110 have been constructed and/or positioning of the soldering pads 135. For example, as discussed elsewhere, the apertures 110 may be formed by a laser cutting process based on a position of the AOCs 104. The rigid substrate 102 may be fixed to the AOC array 106, which may align the apertures 110 relative to the AOCs 104. Positioning the optical fibers 201 in the apertures 110, which have been aligned with the AOCS 104, may further align the optical fibers 201 with the AOCs 104. In addition, the optical fibers 201 may be cut with precision using a fiber cleaving process. The fiber cleaving process may ensure that the fiber ends 212 are substantially planar. The terminal portions 206 may have deposited thereon an anti-reflective coating, which may reduce reflection.

Optical signals (e.g., the optical signal 126) may be communicated along the optical fibers 201. For example, the fiber array 202 may be communicatively coupled to one or more other computing systems, which may communicate the optical signals with the AOC array 106. The optical signals may be communicated to one or more of the AOCs 104 along the optical fibers 201. Additionally or alternatively, one or more of the AOCs 104 may generate optical signals that may be communicated to a transceiver assembly or communication module along the optical fibers 201.

The first optical coupling assembly 200 of FIGS. 2A and 2B may be included in one or more communication modules or optical connectors included in the communication system. The first optical coupling assembly 200 may be included in computing systems (e.g., processors, optical modules, network switches, flip chips, etc.) with onboard optics. For example, the first optical coupling assembly 200 may be incorporated in a connector that substantially complies with media transfer protocol (MTP).

In the first optical coupling assembly 200, the terminal portions 206 are positioned in the apertures 110 and the fiber array 202 is positioned directly on the rigid structure 102. In some embodiments, the fiber array 202 may be positioned in a fiber connector 308 or 408 described below. The fiber connector 308 or 408 may be positioned relative to the rigid substrate 102 and provide support and rigidity to an optical coupling assembly. Some additional details of optical coupling assemblies with fiber connectors are provided with reference to FIGS. 3A-4B.

Figure 3A:
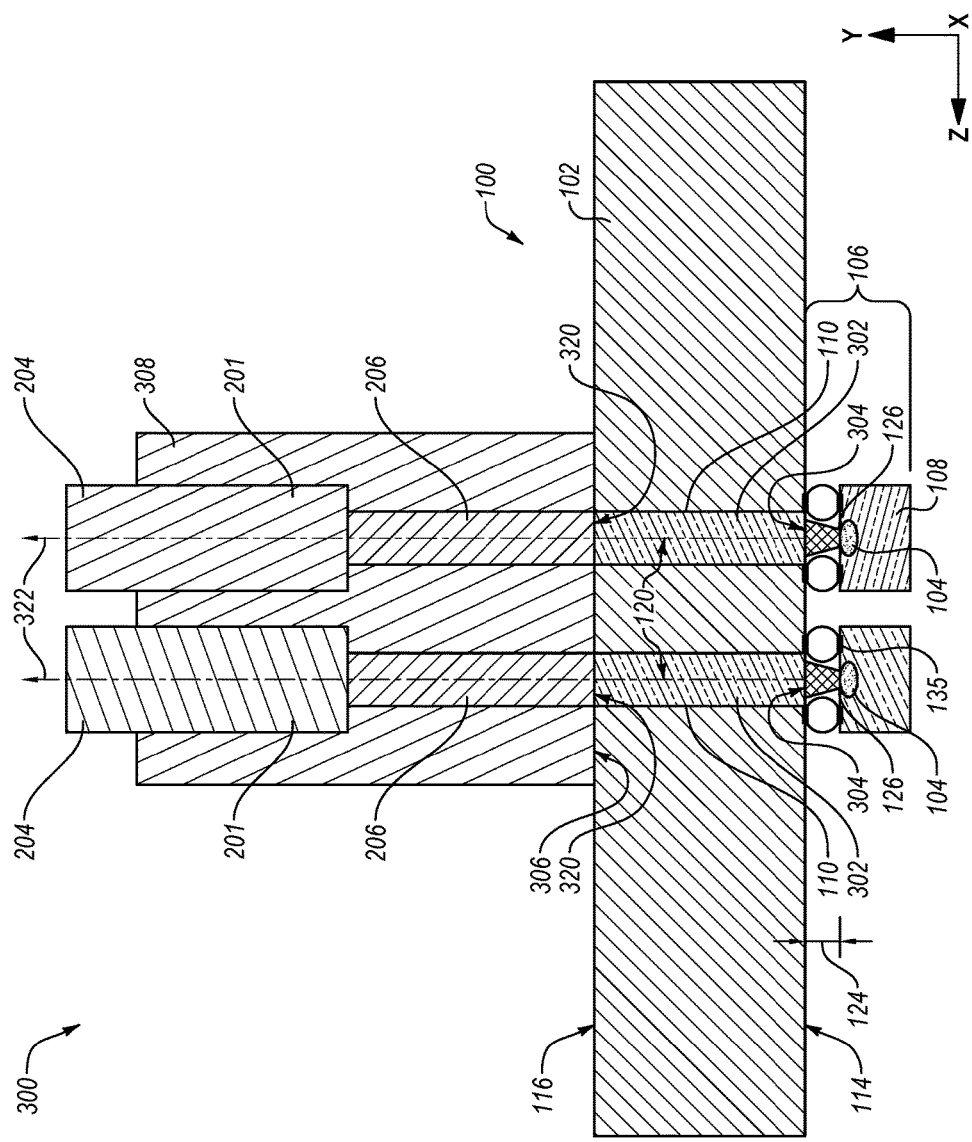
FIG. 3A illustrates another example optical coupling assembly that implements a straight-through fiber connector.

FIG. 3A illustrates a second optical coupling assembly 300 that includes an example embodiment of the fiber coupling assembly 100 of FIG. 1. In the second optical coupling assembly 300, the rigid substrate 102 includes two apertures 110 and the AOC array 106 includes two AOCs 104. In some embodiments, the rigid substrate 102 and the AOC array 106 of FIG. 3A may extend in the x-direction or the negative x-direction such that rigid substrate 102 and the AOC array 106 includes multiple AOCs 104 and/or multiple apertures 110, which may be aligned with the depicted apertures 110. Moreover, additional apertures 110 may be included in the depicted plane of the rigid substrate 102 of FIG. 3A.

In the second optical coupling assembly 300, the apertures 110 may be filled with an optical waveguide 302. An example of the optical waveguide 302 may include laser-transformed glass, a transparent glass, a transparent epoxy, or another suitable material. The optical waveguide 302 may include a material that has a refractive index that is greater than a refractive index of the rigid substrate 102. A difference in the refractive indices between the optical waveguide 302 and the rigid substrate 102 may allow an optical signal or some portion thereof to propagate in the optical waveguide 302 as opposed to disbursing into the material of the rigid substrate 102.

The optical waveguides 302 may extend from the array connection surface 114 to the top substrate surface 116 of the rigid substrate 102. For example, second ends 320 of the optical waveguides 302 may be coplanar or substantially coplanar with the top substrate surface 116 and a first end 304 of the optical waveguides 302 may be coplanar or substantially coplanar with the array connection surface 114. Accordingly, the gap interval 124 in the second optical coupling assembly 300 may be defined between the first end 304 and the AOCs 104 or an active portion thereof.

As discussed above, the gap interval 124 may be determined such that the optical signal 126 may be communicated directly to and/or directly from the optical waveguides 302. An example of the gap interval 124 may be between about 20 microns and about 50 microns in some embodiments. Accordingly, the second optical coupling assembly 300 may not include lenses (e.g., may omit collimating lenses) between the first ends 304 and the AOCs 104.

The embodiment depicted in FIG. 3A is not meant to be limiting. For example, some embodiments of the second optical coupling assembly 300 may include one or more lenses between the first ends 304 and the AOCs 104 or positioned at the first ends 304 or the second ends 320 of the optical waveguides 302. For instance, as described with reference to FIG. 3B, lenses 307 may be positioned at the second end 320 of the optical waveguides 302.

The second optical coupling assembly 300 of FIG. 3A may include a straight-through fiber connector 308. The straight-through fiber connector 308 may be positioned relative to the rigid substrate 102. For example, a substrate contact surface 306 of the straight-through fiber connector 308 may contact the top substrate surface 116. Additionally, in some embodiments, the substrate contact surface 306 may be affixed to the rigid substrate 102 at the top substrate surface 116.

The straight-through fiber connector 308 may retain the optical fibers 201 relative to the AOCs 104 and the optical waveguides 302. For example, in the depicted embodiment, a portion of the jacket 204 may be removed from the terminal portions 206 of the optical fibers 201. The optical fibers 201 may be retained in the straight-through fiber connector 308 such that longitudinal axes 322 of the optical fibers 201 are substantially parallel to the y-axis. The terminal portions 206 of the optical fibers 201 may be secured in the straight-through fiber connector 308. For instance, the terminal portions 206 may be adhered or affixed to the straight-through fiber connector 308.

The straight-through fiber connector 308 may be positioned relative to the rigid substrate 102 such that the AOCs 104 are aligned with the optical waveguides 302 and the optical fibers 201. For example, the centerlines 120 of the apertures 110 may be substantially aligned with the longitudinal axes 322 of the optical fibers 201. Accordingly, optical signals (e.g., the optical signal 126) communicated from one or more of the AOCs 104 may be communicated through the optical waveguides 302 and to the optical fibers 201 (e.g., in embodiments in which the AOCs 104 include transmitters). Similarly, optical signals may travel along the optical fiber 201, through the optical waveguide 302, and to one or more of the AOCs 104 (e.g., in embodiments in which the AOCs 104 include receivers).

In optical coupling assemblies that implement a fiber ribbon connector that is similar to the straight-through fiber connector 308, the fiber ribbon connector may include a fiber end lens and/or a collimating lens. However, the second optical coupling assembly 300 may enable use of the straight-through fiber connector 308, which may not include lenses or may not include one or both of the fiber end lens and/or the collimating lens.

Figure 3B:
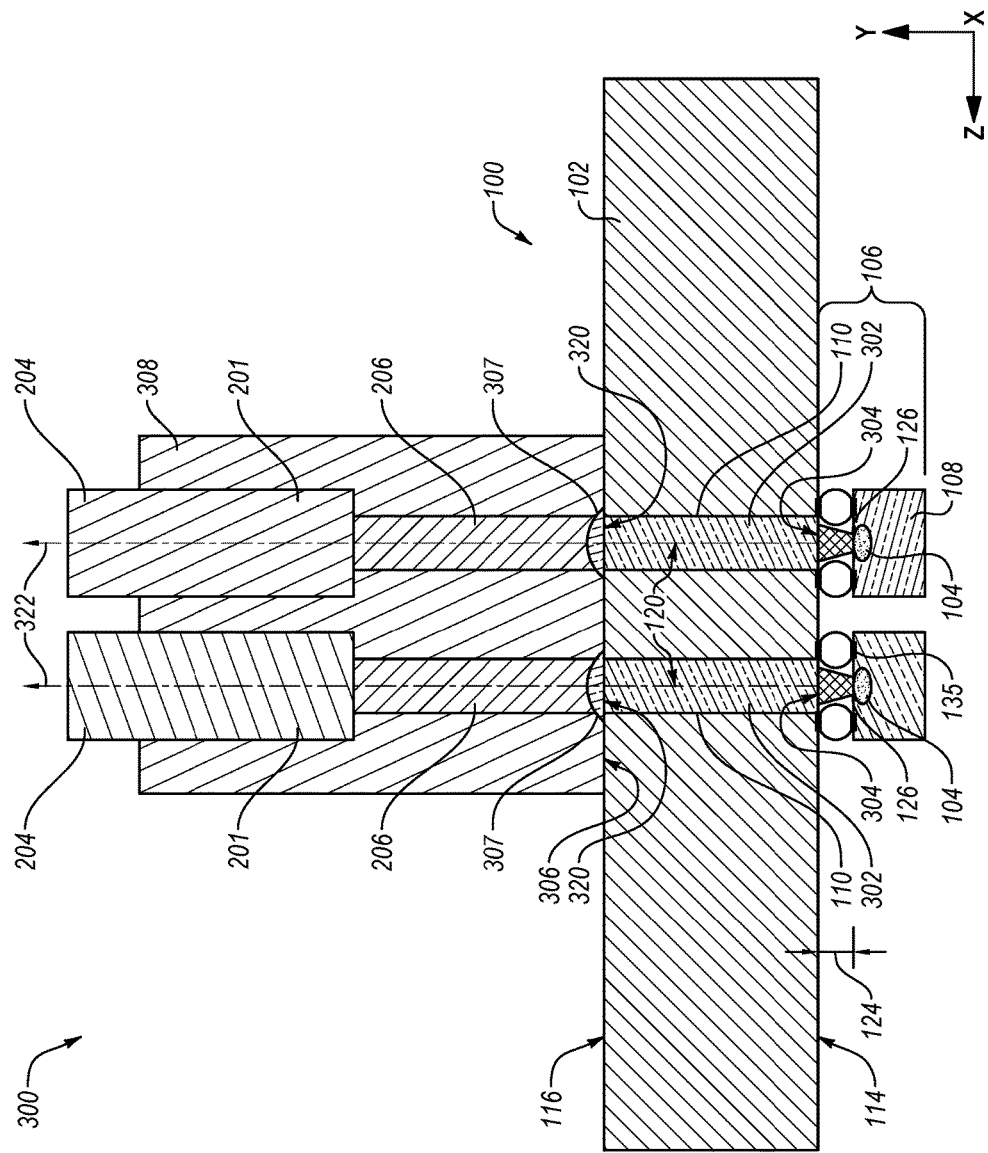
FIG. 3B illustrates the optical coupling assembly of FIG. 3A with lenses.

FIG. 3B depicts another embodiment of the second optical coupling assembly 300. In the embodiment of the second optical coupling assembly 300 depicted in FIG. 3B, the second optical coupling assembly 300 includes the straight-through fiber connector 308, the optical fiber 201, the AOC array 106, and the rigid substrate 102 as described with reference to FIG. 3A. In addition, the second optical coupling assembly 300 of FIG. 3B includes lenses 307.

The lenses 307 may be positioned at the second ends 320 of the apertures 110. The lenses 307 may be configured to focus and/or collimate optical signals 126 as the optical signals 126 propagate between the rigid substrate 102 and the terminal portions 206 of the optical fibers 201.

The lenses 307 may include a curved portion, which may focus and/or collimate the optical signals 126. For example, the lenses 307 may be parabolic lenses. The curved portion may extend above (e.g., having a greater y-coordinate) the top substrate surface 116. Accordingly, the terminal portions 206 of the optical fibers 201 may be elevated (e.g., separated in the y-direction) above the top substrate surface 116. Separation between the optical fibers 201 and the lenses 307 may enable positioning of the lenses 307 immediately adjacent to the optical fibers 201.

As described with reference to FIG. 3A, the substrate contact surface 306 may contact and/or be adhered to the top substrate surface 116. Accordingly, the straight-through fiber connector 308 may couple the optical fibers 201 relative to the rigid substrate 102.

In some embodiments, the lenses 307 may include a second portion that extends into the apertures 110. For instance, the curved portion may be attached or integral to a cylindrical portion that is positioned in the apertures 110. The cylindrical portion may extend a first part of a distance between the top substrate surface 116 and the array connection surface 114. The first part of the distance may include about one-third of the distance, one-half of the distance, or another suitable part of the distance. In these and other embodiments, the optical waveguide 302 may fill the remaining portions of the apertures 110, which may enable propagation of the optical signals 126 through the optical waveguide 302 and the lenses 307.

The lenses 307 may be comprised of a material that is suitable for the optical waveguide 302. For instance, the lenses 307 may be comprised of laser-transformed glass, a transparent glass, a transparent epoxy, or another suitable material.

Figure 4A:
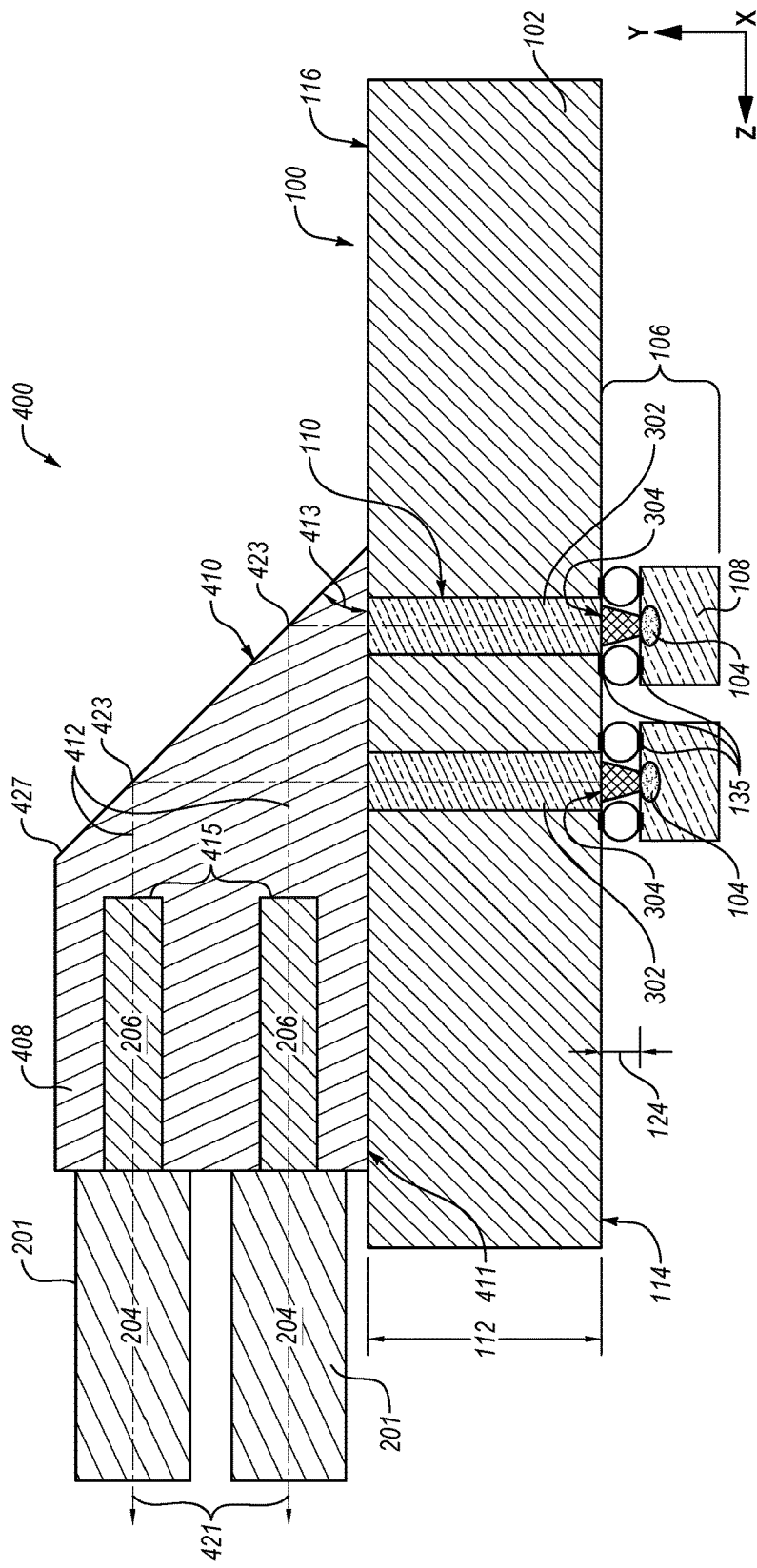
FIG. 4A illustrates another example optical coupling assembly that implements an example reflective fiber connector.

FIG. 4A illustrates a third optical coupling assembly 400 that includes an example embodiment of the fiber coupling assembly 100 of FIG. 1. In the third optical coupling assembly 400, the rigid substrate 102 and the AOC array 106 are substantially similar to the rigid substrate 102 and the AOC array 106 described with reference to FIG. 3A. For instance, the apertures 110 may be filled with the optical waveguides 302 that may extend from the array connection surface 114 to the top substrate surface 116. Accordingly, the gap interval 124 may be defined from the first ends 304 of the optical waveguides 302 to the AOCs 104. The gap interval 124 may be determined such that the optical signal 126 may be communicated directly to and/or directly from the optical waveguides 302. Thus, the third optical coupling assembly 400 may not include lenses between the first ends 304 of the optical waveguides 302 and the AOCs 104.

The embodiment depicted in FIG. 4A is not meant to be limiting. For example, some embodiments of the third optical coupling assembly 400 may include one or more lenses between the first ends 304 and the AOCs 104 or positioned at the first ends 304 or at the second ends 320 (similar to FIG. 3B) of the optical waveguides 302. Additionally, as described with reference to FIG. 4B, lenses 407 may also be positioned reflection areas 423 of FIG. 4A positioned along a reflective edge 427 of a reflective fiber connector 408 (described below).

The third optical coupling assembly 400 of FIG. 4A may include the reflective fiber connector 408. The reflective fiber connector 408 may be configured to be positioned relative to the rigid substrate 102. For example, a substrate contact surface 411 of the reflective fiber connector 408 may contact the top substrate surface 116. Additionally, in some embodiments, the substrate contact surface 411 may be affixed to the rigid substrate 102 at the top substrate surface 116.

The reflective fiber connector 408 may retain the optical fibers 201 relative to the AOCs 104 and the optical waveguides 302. For example, in the depicted embodiment, a portion of the jacket 204 may be removed from the terminal portions 206 of the optical fibers 201. The optical fibers 201 may then be retained in the reflective fiber connector 408. The terminal portions 206 of the optical fibers 201 may be secured in the reflective fiber connector 408. For instance, the terminal portions 206 may be adhered or affixed to the straight-through fiber connector 308.

In some embodiments, the reflective fiber connector 408 may include a light turning mirror 410 positioned along the reflective edge 427. The light turning mirror 410 may redirect optical signals 412. For example, in embodiments in which the AOCs 104 include optical receivers, the optical signals 412 may travel in substantially a positive x-direction as the optical signals 412 exit the optical fibers 201 at fiber ends 415. The optical signals 412 may reflect off the light turning mirror 410 at the reflection areas 423. The optical signals 412 may be re-directed in substantially the negative y-direction towards the optical waveguides 302. The optical signals 412 travel through the optical waveguides 302 and to the AOCs 104.

In embodiments in which the AOCs 104 include optical transmitters, the optical signals 412 may be generated at the AOCs 104. In these and other embodiments, the optical signals 412 may be communicated in the positive y-direction through the optical waveguides 302 to the reflection areas 423. The optical signals 412 may then reflect from the light turning mirror 410, which may redirect the optical signals 412. The optical signals 412 may then travel in a negative x-direction and enter the optical fibers 201 at the fiber ends 415.

In some embodiments, the reflective fiber connector 408 may not include the light turning mirror 410. In these and other embodiments, the reflective fiber connector 408 may reflect the optical signals 412 due to a difference in refractive indices between the reflective fiber connector 408 and the air or another material surrounding the reflective fiber connector 408. For instance, the reflective fiber connector 408 may have a higher refractive index than the material surrounding the reflective fiber connector 408. Accordingly, the optical signals 412 may reflect from the reflective edge 427 of the reflective fiber connector 408.

To enable communication of the optical signals 412, the reflective fiber connector 408 may be positioned relative to the rigid substrate 102 such that the optical waveguides 302 are optically aligned with the terminal portions 206. The position of the reflective fiber connector 408 may be based on distances of longitudinal axes 421 of the optical fibers 201 from the substrate contact surface 411 and an angle 413 of the reflective fiber connector 408.

In the third optical coupling assembly 400, the reflective fiber connector 408 includes two optical fibers 201, the rigid substrate 102 includes two apertures 110, and the AOC array 106 includes two of the AOCs 104. In some embodiments, the reflective fiber connector 408 may include one or more optical fibers 201, the rigid substrate 102 may include one or more apertures 110, and the AOC array 106 may include one or more AOCs 104. Furthermore, the reflective fiber connector 408 of FIG. 4A includes the angle 413 of about 45 degrees. In some embodiments, the angle may include an angle greater than or less than 45 degrees.

In some transceiver assemblies that implement a fiber ribbon connector that is similar to the reflective fiber connector 408, the fiber ribbon connector includes a fiber end lens and/or a collimating lens. However, the third optical coupling assembly 400 may enable use of the reflective fiber connector 408, which may not include lenses or may not include one or both of the fiber end lens and/or the collimating lens.

In FIG. 4A, the reflective fiber connector 408 is included with the rigid substrate 102. In some embodiments, the reflective fiber connector 408 or some variation thereof may be included with one or more optical prisms, optical waveguide structures, angle-bending optical devices, or some combination thereof.

Figure 4B:
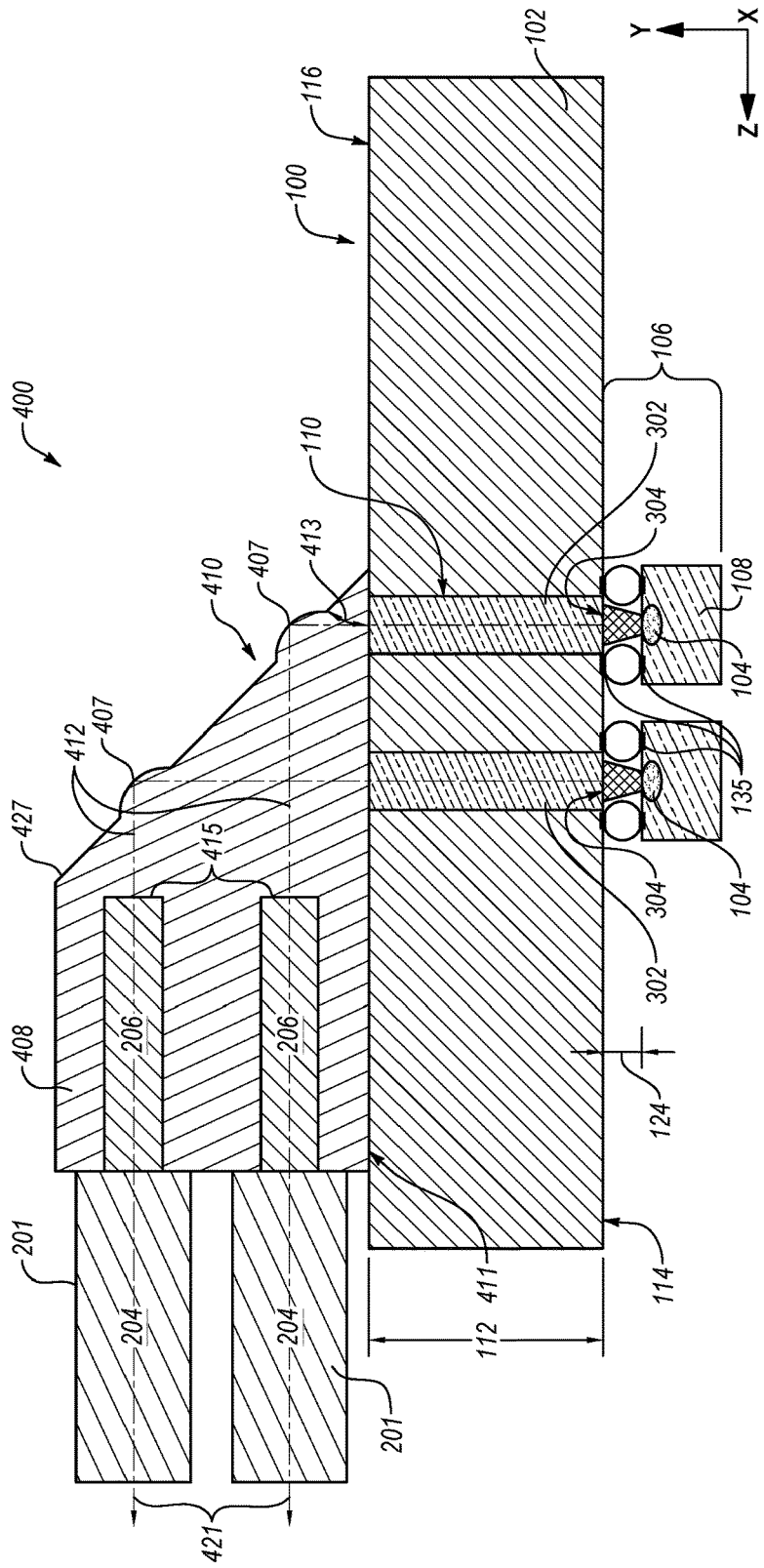
FIG. 4B illustrates the optical coupling assembly of FIG. 4A with lenses, all arranged in accordance with at least one embodiment described herein.

FIG. 4B depicts another embodiment of the third optical coupling assembly 400. In the embodiment of the third optical coupling assembly 400 depicted in FIG. 4B, the third optical coupling assembly 400 includes the reflective fiber connector 408, the optical fiber 201, the AOC array 106, and the rigid substrate 102 as described with reference to FIG. 4A. In addition, the third optical coupling assembly 400 of FIG. 4B includes lenses 407 that are positioned at the reflection areas 423. The lenses 407 may be configured to focus and/or collimate optical signals 126 as the optical signals 126 propagate between the optical waveguides 302 and the terminal portions 206 of the optical fibers 201.

The lenses 407 may include a curved portion, which may focus and redirect the optical signals 412. The curved portion may extend above the reflective edge 427. The curved portion may be comprised of the material of the reflective fiber connector 408. As described with reference to FIG. 4A, the substrate contact surface 411 may contact and/or be adhered to the top substrate surface 116. Accordingly, the reflective fiber connector 408 may couple the optical fibers 201 relative to the rigid substrate 102.

With reference to FIGS. 3A-4B, optical signals (e.g., the optical signal 126 and/or 412) may be communicated along the optical fibers 201. For example, the optical fibers 201 may be communicatively coupled to one or more other transceiver assemblies or communication modules in a communication system. The optical signals may be received from a transceiver assembly or communication module. The optical signals may be communicated to one or more of the AOCs 104 along the optical fibers 201 and through the optical waveguides 302. Additionally or alternatively, one or more of the AOCs 104 may generate optical signals that may be communicated to a transceiver assembly or communication module through the optical waveguides 302 and along the optical fibers 201.

Terms used in the disclosure and in the appended claims (e.g., bodies of the appended claims) are generally intended as "open" terms (e.g., "including" should be interpreted as "including, but not limited to," "having" should be interpreted as "having at least," "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one," "one or more," "at least one of the following," and "one or more of the following" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The present invention may be embodied in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical coupling assembly comprising:
    a fiber coupling structure assembly that includes:
        an active optical component (AOC) array that includes wafer material, one or more AOCs, and one or more soldering pads; and
        a rigid substrate that defines one or more apertures and includes an array connection surface on which one or more additional soldering pads are formed,
        wherein the rigid substrate is fixed to the AOC array by bump joints that connect the one or more soldering pads of the AOC array with the one or more additional soldering pads formed on the array connection surface such that each of the one or more apertures is aligned with a corresponding one of the one or more AOCs; and
    one or more optical fibers positioned relative to the one or more apertures such that an optical signal may be communicated between a corresponding one of the optical fibers and a corresponding one of the one or more AOCs via a corresponding one of the one or more apertures.

2. The optical coupling assembly of claim 1, wherein:
    the one or more AOCs include multiple AOCs separated by a component interval in a first direction, and
    each of the one or more apertures extends in a second direction substantially perpendicular to the first direction.

3. The optical coupling assembly of claim 1, wherein:
    the one or more optical fibers each include a terminal portion from which a jacket has been stripped, and
    the terminal portion of each of the one or more optical fibers is positioned directly in a corresponding one of the one or more apertures such that each of the one or more optical fibers is optically aligned with a corresponding one of the one or more AOCs.

4. The optical coupling assembly of claim 1, wherein the one or more optical fibers include multiple optical fibers in a fiber array.

5. The optical coupling assembly of claim 1, wherein:
    the AOC array includes at least one optical transmitter; and
    an optical signal emitted from the at least one optical transmitter directly enters one of the apertures without passing through a lens.

6. The optical coupling assembly of claim 1, wherein:
    the AOC array includes at least one optical receiver; and
    an optical signal exiting one of the apertures is directly communicated to the at least one optical receiver without passing through a lens.

7. The optical coupling assembly of claim 1, further comprising one or more optical waveguides positioned in each of the one or more apertures.

8. The optical coupling assembly of claim 7, further comprising a straight-through fiber connector that is positioned on a top substrate surface of the rigid substrate, wherein the straight-through fiber connector is configured to retain the one or more optical fibers and align the one or more optical fibers with the one or more AOCs and the one or more optical waveguides.

9. The optical coupling assembly of claim 7, further comprising a reflective fiber connector positioned on a top substrate surface of the rigid substrate, wherein the reflective fiber connector is configured to retain the one or more optical fibers and align the one or more optical fibers with the one or more AOCs and the one or more optical waveguides.

10. The optical coupling assembly of claim 1, wherein the rigid substrate comprises glass or silica.

11. A fiber coupling structure assembly comprising:
    a wafer material;
    an active optical component (AOC) formed in the wafer material;
    two soldering pads formed on a surface of the wafer material, the two soldering pads being positioned adjacent to the AOC;
    a rigid substrate that defines an aperture and includes an array connection surface on which two additional soldering pads are formed adjacent to the aperture; and
    two bump joints that connect the two soldering pads formed on the surface of the wafer material to the two additional soldering pads formed on the array connection surface,
    wherein:
        the soldering pads on the surface of the wafer material and the additional soldering pads are formed on the array connection surface such that a centerline of the aperture is aligned with an active portion of the AOC, and
        the AOC is separated from the array connection surface by a gap interval that enables communication of an optical signal between the aperture and the AOC without a lens positioned therebetween.

12. The fiber coupling structure of claim 11, wherein the gap interval is between about 20 microns and about 50 microns.

13. The fiber coupling structure of claim 11, further comprising a second AOC that is formed in the wafer material and is separated from the AOC by a component interval that is between about 248 microns and about 252 microns, wherein the rigid substrate defines a second aperture that is aligned with the second AOC.

14. The fiber coupling structure of claim 11, further comprising an optical waveguide that is positioned in the aperture, wherein:
the optical waveguide includes a first end that is substantially aligned with the array connection surface; and
the gap interval is defined such that the optical signal is communicated directly from the AOC to the first end of the optical waveguide.

15. An optical coupling assembly comprising:
an active optical component (AOC) array that includes wafer material, one or more AOCs, and one or more soldering pads;
a rigid substrate that defines one or more apertures and includes an array connection surface on which one or more additional soldering pads are formed, the rigid substrate being fixed to the AOC array by bump joints that connect the one or more soldering pads of the AOC array with the one or more additional soldering pads formed on the array connection surface such that each of the one or more apertures is aligned with a corresponding one of the one or more AOCs; and
one or more optical fibers positioned relative to the one or more apertures such that an optical signal may be communicated between a corresponding one of the optical fibers and a corresponding one of the one or more AOCs via a corresponding one of the one or more apertures.

16. The optical coupling assembly of claim 15, wherein:
the optical fibers are included in a fiber array;
the optical fibers include terminal portions of the fiber array of which a jacket has been stripped;
the terminal portions of the optical fibers are positioned directly in the apertures such that the optical fibers are optically aligned with active portions of the AOCs and fiber ends of the optical fibers are substantially aligned with the array connection surface; and
the AOCs are separated from the array connection surface by a gap interval that enables communication of an optical signal between the fiber ends and the AOCs without a lens positioned therebetween.

17. The optical coupling assembly of claim 15, further comprising optical waveguides that are positioned in the apertures, wherein:
the optical waveguides include first ends that are substantially aligned with the array connection surface; and
the AOCs are separated from the array connection surface by a gap interval that enables communication of an optical signal between the first ends and the AOCs without a lens positioned therebetween.

18. The optical coupling assembly of claim 17, further comprising a straight-through fiber connector positioned on a top substrate surface of the rigid substrate, wherein the straight-through fiber connector is configured to retain the optical fibers and align the optical fibers with the AOCs and the optical waveguides.

19. The optical coupling assembly of claim 18, further comprising lenses positioned on second ends of the optical waveguides.

20. The optical coupling assembly of claim 17, further comprising a reflective fiber connector positioned on a top substrate surface of the rigid substrate,
wherein:
the reflective fiber connector is configured to retain the optical fiber and align the optical fiber with the AOC and the optical waveguide; and
the reflective fiber connector includes a reflective edge that redirects the optical signal from the optical waveguides to the optical fibers.

* * * * *